United States Patent
Bhorkar et al.

(10) Patent No.: US 10,110,393 B2
(45) Date of Patent: Oct. 23, 2018

(54) PROTOCOL SWITCHING OVER MULTI-NETWORK INTERFACE

(71) Applicant: Cavium, Inc., San Jose, CA (US)

(72) Inventors: Abhay Bhorkar, Cupertino, CA (US);
Abhijit Ayarekar, San Jose, CA (US);
Anil M. Kongovi, Mandya (IN);
SathishKumar Mani, Bangalore (IN)

(73) Assignee: Cavium, Inc., San Jose, CA (US)

( * ) Notice: Subject to any disclaimer, the term of this patent is extended or adjusted under 35 U.S.C. 154(b) by 438 days.

(21) Appl. No.: 14/042,403

(22) Filed: Sep. 30, 2013

(65) Prior Publication Data

US 2015/0095510 A1 Apr. 2, 2015

(51) Int. Cl.
*H04L 12/28* (2006.01)
*H04L 29/06* (2006.01)

(52) U.S. Cl.
CPC ...... *H04L 12/2805* (2013.01); *H04L 65/1083* (2013.01); *H04L 65/608* (2013.01)

(58) Field of Classification Search
CPC .... G06F 3/1462; G09G 5/14; G09G 2370/10; H04L 65/4069; H04L 65/60; H04L 65/604; H04L 12/00; H04L 12/2805; H04L 65/1083; H04L 65/608; H04W 4/00; H04N 21/41407; H04N 21/4782; H04N 21/00
USPC ................. 709/231, 227, 228, 230
See application file for complete search history.

(56) References Cited

U.S. PATENT DOCUMENTS

| | | | |
|---|---|---|---|
| 7,590,149 B1* | 9/2009 | Bharali | H04L 45/00 370/235 |
| 8,356,323 B2* | 1/2013 | Chiang | H04L 12/2801 725/133 |
| 2012/0208466 A1* | 8/2012 | Park | G06F 1/1601 455/41.3 |
| 2013/0219072 A1* | 8/2013 | Han | H04L 65/60 709/228 |
| 2014/0026068 A1* | 1/2014 | Park | G06F 3/0482 715/748 |
| 2014/0244854 A1* | 8/2014 | Patel | H04N 21/41407 709/231 |
| 2014/0334381 A1* | 11/2014 | Subramaniam | H04L 65/604 370/328 |

OTHER PUBLICATIONS

"MS-DLNHND-DLNA networked device interoperability Guidelines: Microsoft Extensions", Jul. 22, 2013.*
Emrich ("Implementing a DLNA-compliant UPnP AV MediaServer with DVB and RTSP/RTP support," Apr. 28, 2009).*

* cited by examiner

*Primary Examiner* — Edward Kim
(74) *Attorney, Agent, or Firm* — pkalousek.ip

(57) ABSTRACT

This application is directed to protocol switching over multi-network interface, specifically switching between mirroring and streaming protocols using one L2 connection established between a source multimedia device and a sink multimedia device, depending on the application and/or multimedia content and as facilitated by a controller device.

20 Claims, 10 Drawing Sheets

PROTOCOL SWITCHING OVER MULTI-NETWORK INTERFACE

FIELD OF THE APPLICATION

This disclosure is directed to protocol switching over multi-network interface and, more particularly, to switching between mirroring and streaming protocols in wireless, multimedia devices depending on the application and/or content.

DETAILED DESCRIPTION

Figure 1:
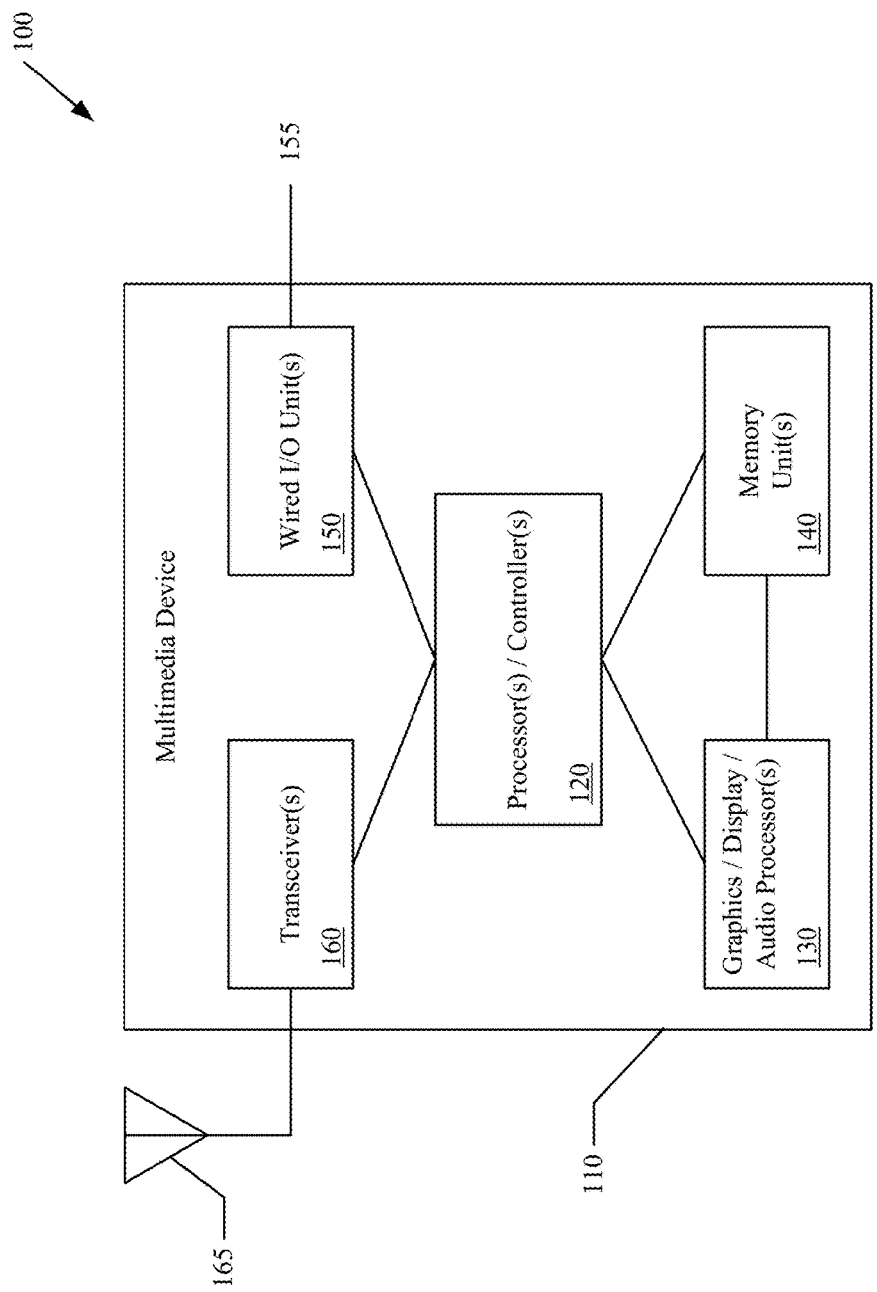
FIG. 1 illustrates an exemplary multimedia device block diagram 100 as may be used according to certain embodiments.

The following detailed description is directed to certain sample embodiments. However, the disclosure can be embodied in a multitude of different ways as defined and covered by the claims. In this description, reference is made to the drawings wherein like parts are designated with like reference numerals throughout.

This application discusses switching between and among communication protocols used in multimedia devices for sharing multimedia content. Such multimedia devices can be connected via wired or wireless interfaces, but wireless devices will be discussed herein for exemplary purposes only. The wireless multimedia devices discussed herein can include, for example, smart phones, tablets, laptops, smart televisions (smart TVs), regular TVs (dumb TVs) using one or more plug-in dongles, audio/video (A/V) components, projectors, wireless access devices, set-top boxes, and the like. Generally, any device having the requisite wireless capabilities and having the necessary protocol capabilities, as discussed herein, is capable of implementing certain embodiments of this disclosure.

Some of the communication protocols used with this disclosure can include, for example, WiFi, Bluetooth, Long Term Evolution (LTE), WiMAX, WiFi Peer-to-Peer (P2P), WiFi Direct, WiFi Display (WFD), Miracast, WiVu, WiDi, Digital Living Network Alliance (DLNA), and so on. As used here in, WiFi Peer-to-Peer (P2P) and WiFi Direct may be used interchangeably, despite one being the former being a technical specification and the latter being a branding for that technical specification. Likewise, as used herein, WiFi Display (WFD) and Miracast may be used interchangeably, despite the former being a technical specification and the latter being a branding for that technical specification.

Generally, communication protocols used with certain embodiments can be placed into two categories: mirroring protocols and streaming protocols. Both mirroring and streaming protocols can be used to transfer content from a source device ("source" or "src") to a sink device ("sink"). Both of these techniques are provided for in various standards or specifications and make it possible for two or more devices, even from different manufacturers, to transfer multimedia content between them. For the purposes of this application, the main difference between mirroring and streaming is that mirroring is used when the content is encoded on-the-fly at the source device just prior to transfer (e.g., substantially in real-time), while streaming is used for showing content that has been pre-encoded and possibly stored for later transfer and/or for multiple transfers. Therefore, mirroring may be more suitable for interactive (e.g., two-way, etc.) applications such as text messaging, emailing, showing presentation, gaming, and the like, while streaming may be more suitable for non-interactive (e.g., one-way, etc.) applications such as playing audio or video files, showing photos, and so on. As used with certain embodiments of this disclosure, examples of multimedia streaming protocols can include, for example, Digital Living Network Alliance (DLNA), which uses Universal Plug and Play (UPnP). Examples of multimedia mirroring protocols can include, for example, WFD/Miracast, WiVu, WiDi, and the like.

Note that mirroring is sometimes referred to as screencasting, which is essentially a near real-time digital video screen capture (e.g., encoding, etc.) of one device's audio/video (A/V) output (the source) and then transferring it over a network (e.g., WiFi, WiFi Direct, Bluetooth, LTE, etc.) to another device (the sink) for viewing the A/V content, such as a television. It is this process that can make mirroring protocols unsuitable for streaming applications, even though they may be used in an inefficient, pseudo-streaming manner. For example, assume that a mirroring protocol is to be used to "stream" a movie from a source device to a sink device. First, the source device must "play" the movie locally, which requires retrieving, decoding and "displaying" the movie. Next, as the source device is "playing" the movie locally, the mirroring protocol must capture the movie (e.g., frame-by-frame, block-by-block, pixel-by-pixel, etc.) and re-encode it for transfer to the sink device (i.e., this decoding and re-encoding process by the mirroring protocol at the source device may be referred to herein as transcoding). Finally, the sink device (e.g., using the same mirroring protocol as the source device) must then decode the movie for display. The transcoding process at the source device can cause large latencies at the sink device, can degrade the content quality at the sink device and/or can use a large amount of battery power, memory space and processing bandwidth at the source device. Any or all of these effects may be undesirable to the user and/or the user experience, which is at least one reason why streaming-specific protocols, like DLNA, can be used to directly transfer the encoded content to the sink device without the transcoding step.

In some multimedia devices today, streaming and mirroring protocols can be preinstalled in both the source devices and in the sink devices. However, switching between a streaming and a mirroring protocol requires dropping a connection to one and reestablishing a connection to the other. For example, the WFD/Miracast mirroring protocol prevents the reuse of a layer two (L2) connection (i.e., in the context of this application, an L2 connection refers to the data link layer of the Open Systems Interconnection (OSI) communication model or equivalent (e.g., the link layer in the TCP/IP reference model, etc.), which can provide the functional and procedural means to transfer data between communicating devices and can be concerned with the local delivery of frames between those devices.). Thus, when switching from DLNA streaming to, for example, Miracast mirroring and back again, Miracast requires dropping the initial L2 peer-to-peer (P2P) connection, establishing a new L2 connection for the Miracast session with WFD, dropping that L2 connection after Miracast mirroring and finally reestablishing a new L2 DLNA connection after the mirroring session ends. Each of the dropping/establishing of an L2 connection can add as much as a 4-5 second delay to the user experience (or as much as 20-30 seconds for a first time connection), which may be undesirable to the user.

FIG. 1 illustrates an exemplary multimedia device block diagram 100 as may be used according to certain embodiments. As shown in FIG. 1, a multimedia device 110 includes one or more processors and/or controllers 120, one or more graphics/display/audio processors 130, one or more memory units 140, one or more wired input/output (I/O) units 150 with one or more wired I/O connections 155, and one or more wireless transceivers 160, each with one or more antennas 165. For ease of description purposes only, multimedia device 110 will not be described as only having one of each of these.

Processor/controller 120, for example, can perform the main processing, controlling and data/signaling management functions associated with multimedia device 110, as well as those related functions associated with certain embodiments of this disclosure. Processor/controller 120 can be any device capable of performing these functions, such as a general purpose processor, a digital signal processor (DSP), an application specific integrated circuit (ASIC), a field programmable gate array (FPGA) or other programmable logic device, discrete gate or transistor logic, discrete hardware components, or any combination thereof.

Graphics/display/audio processor 130 can be one or more units that provide audio/video processing support to processor/controller 120 or perform the audio/video, task-specific functions for processor/controller 120. Graphics/display/audio processor 130 can be coupled to processor/controller 120. Graphics/display/audio processor 130 can be any device capable of performing these functions, such as a general purpose processor, a digital signal processor (DSP), an application specific integrated circuit (ASIC), a field programmable gate array (FPGA) or other programmable logic device, discrete gate or transistor logic, discrete hardware components, or any combination thereof.

Memory unit 140 can provide data, control and/or signaling storage for multimedia device 110. Memory unit 140 can be coupled to processor/controller 120 and/or graphics/display/audio processor 130. All or part of memory unit 140 can be embedded within processor/controller 120 and/or graphics/display/audio processor 130. Memory unit 140 can be any type of volatile or non-volatile memory and/or removable or non-removable memory, for example, RAM memory, flash memory, ROM memory, EPROM memory, EEPROM memory, registers, hard disk, solid-state device, a removable disk, a CD-ROM or other optical drive, a thumb-drive or similar type drive, or any other form or combination of storage medium known in the art.

Wired input/output (I/O) unit 150 can be connected to processor/controller 120 and can provide the interface/communication functions for any type of wired connection 155 used by multimedia device 110 to communicate with any device external to multimedia device 110. For example, wired I/O unit 150 and associated connection 155 can be used to connect multimedia device 110 to one or more other devices via HDMI, USB, Firewire, DVI, Ethernet, and so on. Similarly, transceiver 160 can be connected to processor/controller 120 and can provide the interface/communication functions for any type of wireless connection via antenna 165 used by multimedia device 110 to communicate with any device external to multimedia device 110. For example, transceiver 160 and associated antenna 165 can be used to connect multimedia device 110 to one or more other devices via WiFi, WiFi Direct, Bluetooth, LTE, and so on.

In certain embodiments, the various hardware blocks of multimedia device 110 illustrated in FIG. 1 can be combined, all or only some, into a single system-on-a-chip (SoC) device. Additionally, certain additional components may be included or blocks may not be included without deviating from the scope of this application. All or part of some blocks may be included with one or more of the other blocks. In general, certain embodiments of this disclosure can operate with and/or within a virtual infinite number of hardware block configurations.

Figure 2:
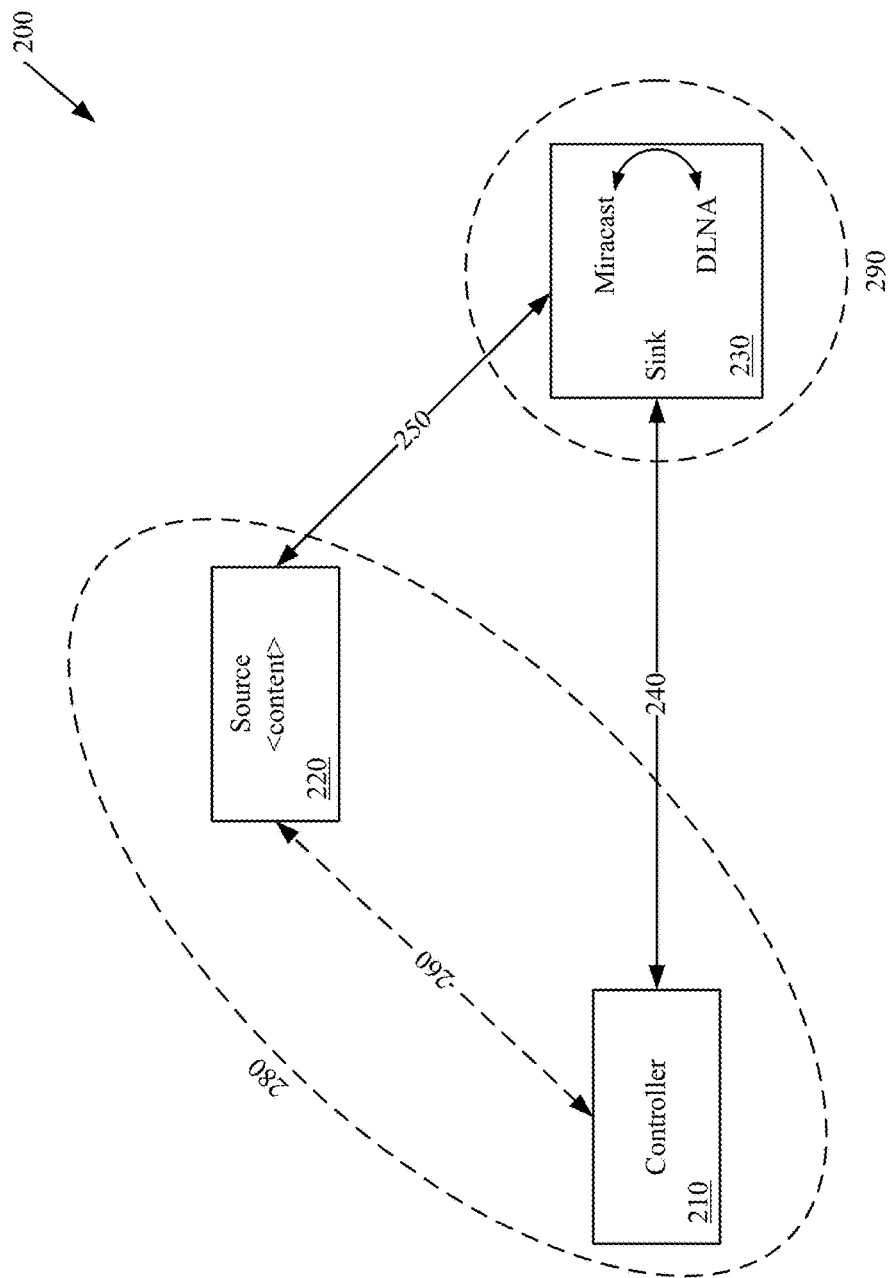
FIG. 2 illustrates an exemplary functional diagram 200 according to certain embodiments.

FIG. 2 illustrates an exemplary functional diagram 200 according to certain embodiments. As shown in FIG. 2, three functional units are interconnected: a controller 210, a source 220 and a sink 230. Even though this disclosure may describe controller 210 and source 220 as being functionally separate, they may actually one, physical multimedia device. The functions of sink 230 may be a device separate from the device (or devices) containing controller 210 and source 220. For discussion purposes only, which in no way is meant to limit this application, interconnections 240 and 250 can be an L2 wireless communication link, such as provided using peer-to-peer (P2P) Wifi-Display. Interconnection 260, as needed, may not be an external communication link, depending on whether controller 210 and source 220 are the same device. If they are not the same device, then interconnection 260, as needed, may also be an L2 wireless communication link, such as provided using peer-to-peer (P2P) Wifi-Display. If controller 210 and source 220 are the same device, then interconnections 240 and 250 may also be the same connection.

In certain embodiments, controller 210 can direct multimedia content transfer between source 220 and sink 250. Depending on the type of multimedia content, controller 210 can use various multimedia transfer protocols, such as, WiDi, Miracast, WiVu and DLNA, each of which may be local to and usable by source 220 and sink 230. For example, if the multimedia content is email or text data (i.e., interactive traffic), then controller 210 can instruct source 220 and sink 230 to communicate via a mirroring protocol, like Miracast. If the multimedia content is a video that resides at source 220, then controller 210 can instruct source 220 and sink 230 to communicate via a streaming protocol, like DLNA. Miracast and DLNA are mere examples of link-level mirroring and streaming protocols that can be used with certain embodiments of this application and are in no way meant to limit this disclosure.

An exemplary use scenario of the functions illustrated by FIG. 2 includes a smartphone 280 that may be in communication with a television 290 for the purposes, e.g., of reading and answering email messages and/or watching a video clip. Note that in this scenario, both the messages and the video reside on smartphone 280. In this scenario, smartphone 280 may act as controller 210 and source 220, while television 290 may act as sink 230. Smartphone 280 may have previously received the email messages via a cellular data communication system (e.g., CDMA, LTE, etc., not shown), while smartphone 280 and television 290 may be communicating via a P2P, WiFi Display connection (i.e., a wireless L2 connection), illustrated as interconnections 240 and 250. In a typical smartphone today, switching between viewing emails and watching a video clip requires one of two methods: 1) smartphone 280 can "force" a mirroring protocol to act as in a "pseudo-streaming" manner for showing the video clip, or 2) smartphone 280 can completely disconnect from the mirroring session, including the L2 connection, and then re-establish a new L2 session for the streaming protocol.

In certain embodiments, smartphone 280 and television 290 (or more generally, any multimedia devices) may switch between using a mirroring protocol, such as Miracast, for transferring interactive content (e.g., emails, texts, games, etc.) and using a streaming protocol, such as DLNA, for transferring the non-interactive content (e.g., music, videos, pictures, etc.) without having to tear down and reestablish L2 connections. In this way, a single L2 connections between smartphone 280 and television 290 can be used and reused as many times as needed for switching back and forth (and back again, etc.) between a mirroring protocol and a streaming protocol. Such L2 connection reuse can significantly reduce the switching time between the protocols (e.g. from 3-4 seconds to a few microseconds, i.e., almost instantaneously for the user, or many orders of magnitude reduction).

Figure 3:
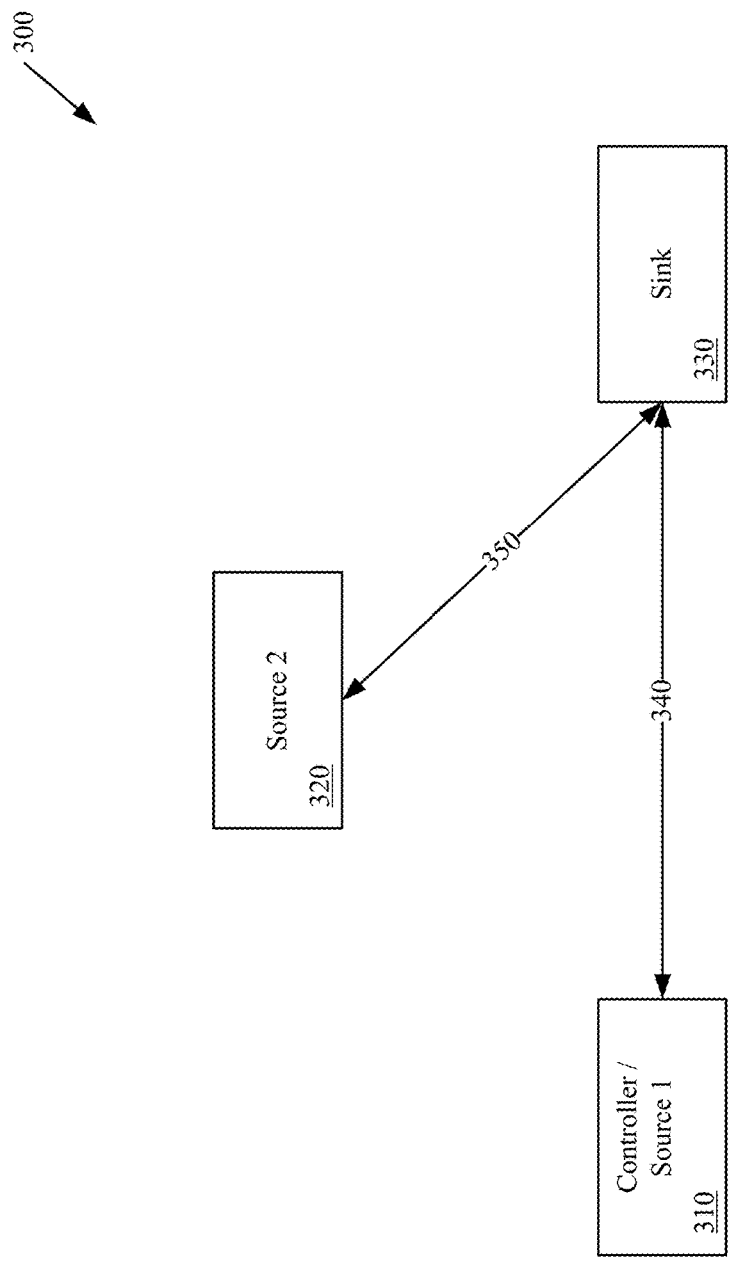
FIG. 3 illustrates an exemplary functional diagram 300 according to certain embodiments.

FIG. 3 illustrates an exemplary functional diagram 300 according to certain embodiments. As shown in FIG. 3, three functional units are interconnected: a controller/source 1 310, a source 2 320 and a sink 330. In a very general way, these functional units are similar as those described with reference to FIG. 2. However, in functional diagram 300, controller/source 1 310 can provide the controlling functionality and some of the content sourcing functionality. For example, mirroring content using Miracast can be sourced from controller/source 1 310. Source 2 320 can provide streaming content and can be a network attached storage (NAS) device, or similar. Sink 330 can be instructed by controller/source 1 310 to set-up, launch or run a suitable protocol (e.g., DLNA) for playing the content directly from source 2 320. For this purpose, for example, universal plug and play (UPnP), discover and launch (DIAL) and/or similar protocol may be used.

In certain embodiments, sink 330 can use a peer-to-peer L2 connection 340 with controller/source 1 310 for mirroring and then, without having to first tear down that P2P L2 connection, sink 330 also can use a peer-to-peer L2 connection 350 to the source 2 320 for streaming the media content from, for example, a movie from the NAS drive. In typical applications of today, if a mirroring protocol, like Miracast, were going to be used along with a NAS drive, then controller/source 1 310 would have to receive the streaming content first from the NAS drive (that connection not shown, or necessary, in FIG. 3), transcode it, and then transmit it to sink 330. This "receive/transcode/re-transmit" process of today is rendered moot by certain embodiments of the present application.

Figure 4:
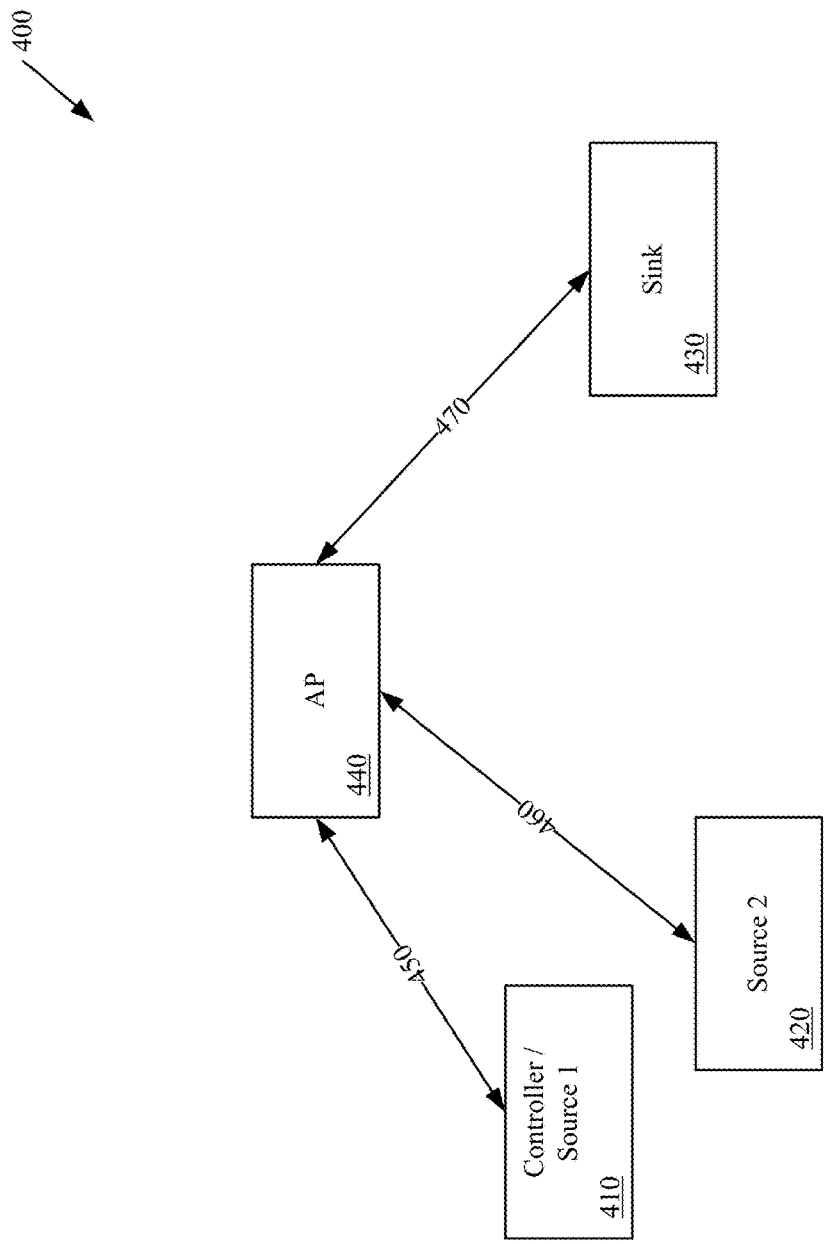
FIG. 4 illustrates an exemplary functional diagram 400 according to certain embodiments.

FIG. 4 illustrates an exemplary functional diagram 400 according to certain embodiments. As shown in FIG. 4, four functional units are interconnected: a controller/source 1 410, a source 2 420, a sink 430 and an access point (AP) 440. In a very general way, these functional units are similar as those described with reference to FIGS. 2-3. However, in functional diagram 400, controller/source 1 410 can provide the controlling functionality and some of the content sourcing functionality. For example, mirroring content using Miracast can be sourced from controller/source 1 410. Source 2 420 can provide streaming content and can be a second multimedia device, e.g., another smartphone or similar. Both controller/source 1 410 and source 2 420 can be interconnected to sink 430 via access point 440. Sink 430 can be instructed by controller/source 1 410, via AP 440, to set-up, launch or run a suitable protocol (e.g., DLNA) for playing the content from source 2 420, also via AP 440. For this purpose, for example, Wi-Fi oriented connections and/or similar may be used, depending on AP 440.

In certain embodiments, each of controller/source 1 410 and source 2 430 can use an access point related L2 connection to communicate with sink 430, which also can use an access point related L2 connection. In this way, sink 430 can maintain a one L2 connection with AP 440, while switching between a mirroring protocol (e.g., Miracast) for receiving the content from controller/source 1 410 and a streaming protocol (e.g., DLNA) for receiving the content from source 2 420.

Figure 5:
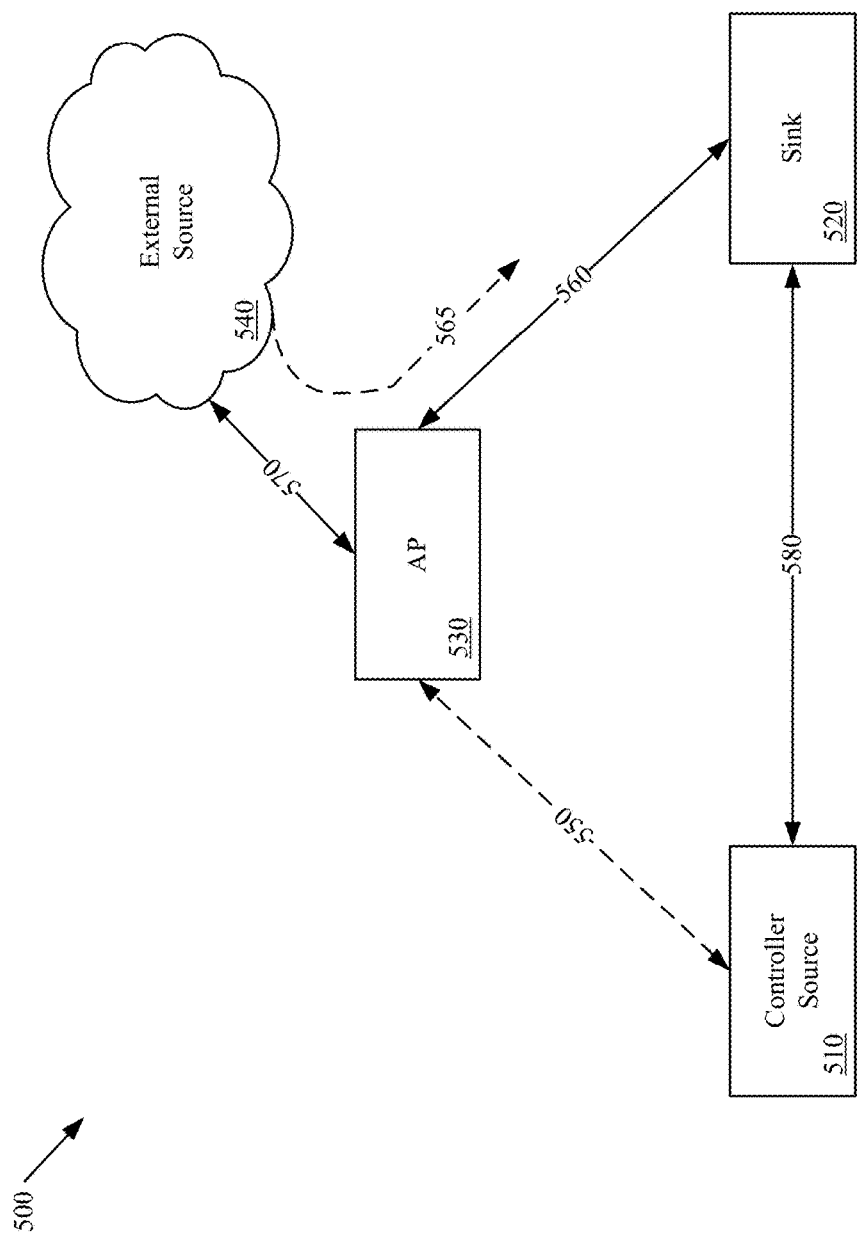
FIG. 5 illustrates an exemplary functional diagram 500 according to certain embodiments.

FIG. 5 illustrates an exemplary functional diagram 500 according to certain embodiments. As shown in FIG. 5, four functional units are interconnected: a controller/source 510, a sink 520, an access point (AP) 530 and an external source 540. In a very general way, these functional units are similar as those described with reference to FIG. 2-4. However, in functional diagram 500, controller/source 510 can provide the controlling functionality and some of the content sourcing functionality. For example, mirroring content using Miracast can be sourced from controller/source 510. External source 540 can provide streaming content and can be any externally accessed storage device, such as an Internet sourced video (e.g., YouTube, etc.) or similar. Sink 520 can be instructed by controller/source 510 to set-up, launch or run a suitable protocol (e.g., DLNA) for playing the content from external source 540. For this purpose, for example, universal plug and play (UPnP), discover and launch (DIAL) and/or similar may be used. External source 540 can be interconnected to sink 520 via access point 530. For this purpose, for example, Wi-Fi oriented connections and/or similar may be used, depending on AP 530.

In certain embodiments, sink 520 can use a peer-to-peer L2 connection 580 with controller/source 510 for mirroring and can use an access point related L2 connection 560 for streaming the media content from external source 540 via AP 530 effectively using connection 565. Additionally, controller/source 510 can use an access point related L2 connection 550 with AP 530 for initiating the location (e.g., Internet address, etc.) of the streaming content from external source 540. However, connection 550 may be unnecessary in certain embodiments, when sink 520 is capable of initiating the location of the streaming content from external source 540, which it can receive from controller/source 510 via connection 580. In this way, while sink 520 is mirroring content via connection 580 from controller/source 510, it can switch to receiving streaming content from external source 540, without having to tear down and re-establish an L2 connection. In typical applications of today, if a mirroring protocol, like Miracast, were going to be used along with external source 540, then controller/source 510 would have to receive the streaming content first from external source 540 (via connection 550), transcode it, and then transmit it to sink 520 using connection 580. This "receive/transcode/re-transmit" process of today is rendered moot by certain embodiments of the present application.

Figure 6:
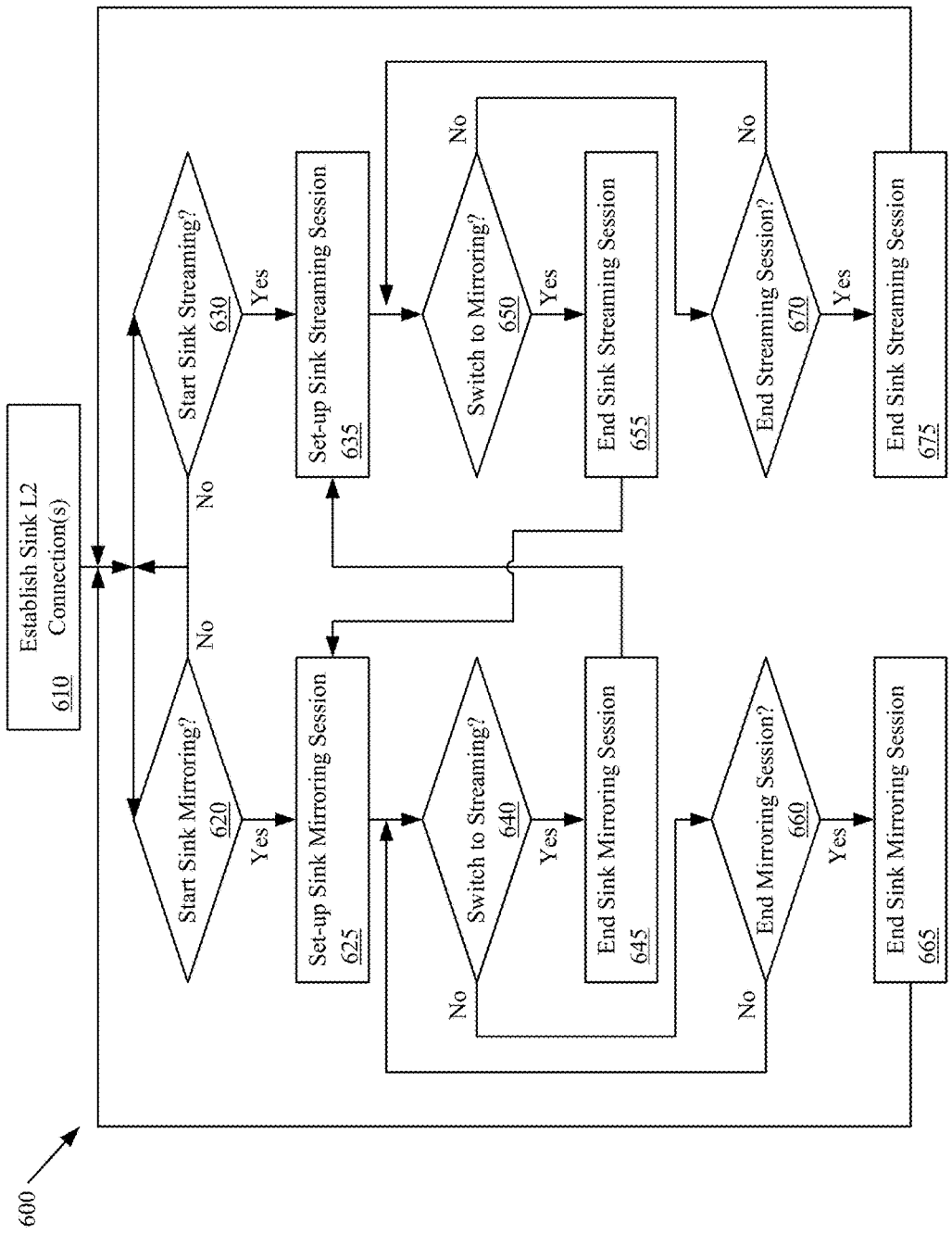
FIG. 6 illustrates an exemplary protocol switching flow chart 600 according to certain embodiments.

FIG. 6 illustrates an exemplary protocol switching flow chart 600 according to certain embodiments. The details and implementation of blocks and elements of flow chart 600 can be as further described throughout this application. As shown in FIG. 6, at 610, one or more L2 connections can be established at a sink device, between it and one or more other devices (e.g., one or more source device, control, and/or network devices, etc.). From 610, the sink device can begin either a mirroring session (e.g., using Miracast) or a streaming session (e.g., using DLNA). Regardless of which is started first, the general process of flow chart 600 includes setting-up the respective session, switching to the other session without dropping the L2 connection and switching back to the original session, again, without dropping the L2 connection. Switching between mirroring and streaming can happen any number of times using the same, originally-set-up L2 connection(s).

In certain embodiments, as shown in FIG. 6, at 620, a mirroring session can be started at the sink device. If no mirroring session is started, then the sink device can check on whether either session needs to be started (at 620 and 630). At 625, a mirroring session (e.g., using Miracast) is set-up on the sink device. At 640, a switch to a streaming session at the sink device can be decided upon. If no switching is decided, then at 660, an end to the mirroring session can be checked. If the mirroring session is to end, then at 665, the mirroring session is ended at the sink device and processing can go back to 620, 630 to check on starting a new session. If, at 660, the mirroring session is not ending, then processing can pass back to 640 for checking on a switch to a streaming session. If at 640, there is a switch to a streaming session, then at 645 the mirroring session at the sink device is ended and at 635, a sink streaming session is set-up (e.g., using DLNA).

In certain embodiments, as shown in FIG. 6, at 630, a streaming session can be started at the sink device. If no streaming session is started, then the sink device can check on whether either session needs to be started (at 620 and 630). At 635, a streaming session (e.g., using DLNA) is set-up on the sink device. At 650, a switch to a mirroring session at the sink device can be decided upon. If no switching is decided, then at 670, an end to the streaming session can be checked. If the streaming session is to end, then at 675, the streaming session is ended at the sink device and processing can go back to 620, 630 to check on starting a new session. If, at 670, the streaming session is not ending, then processing can pass back to 650 for checking on a switch to a mirroring session. If at 650, there is a switch to a mirroring session, then at 655 the streaming session at the sink device is ended and at 625, a sink mirroring session is set-up (e.g., using Miracast).

Figure 7:
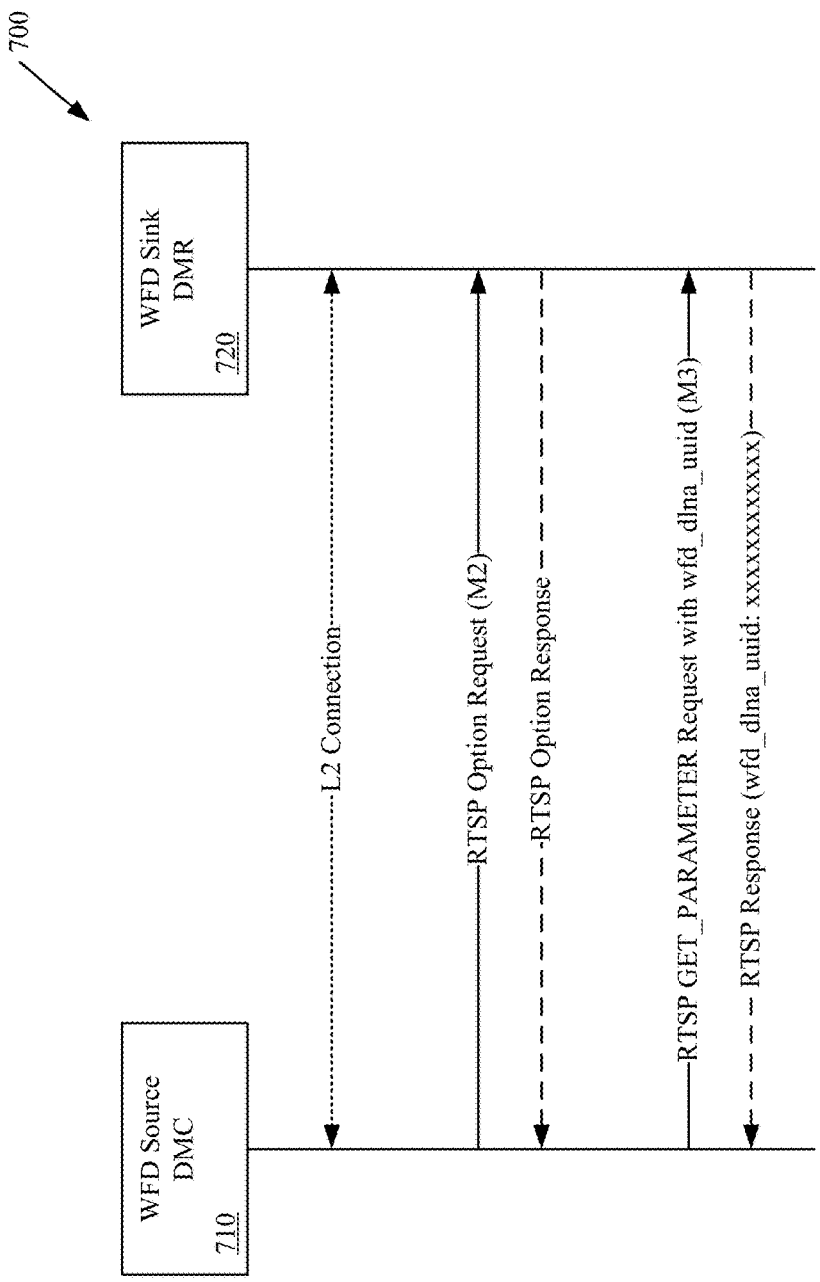
FIG. 7 illustrates an exemplary sequence diagram 700 for sharing DLNA universally unique identifier (UUID) according to certain embodiments.

FIG. 7 illustrates an exemplary sequence diagram 700 for sharing DLNA universally unique identifier (UUID) according to certain embodiments. As shown in FIG. 7, the DLNA UUID sharing sequence can be between a Wi-Fi Display (WFD) source 710 and a Wi-Fi Display (WFD) sink 720. WFD source 710 can include the digital media controller (DMC) and WFD sink can include the digital media renderer or receiver (DMR). Initially, an L2 connection can be initiated between WFD source 710 and WFD sink 720. Ultimately, this L2 connection can be as discussed elsewhere in this disclosure.

In certain embodiments, WFD source 710 can send a real time streaming protocol (RTSP) options (or M2) request to WFD sink 720. In general, RTSP can be used for establishing and controlling media sessions between end points and the RTSP options can be used to indentify the accepted request type(s). WFD sink 720 can respond with an RTSP option response. Next, WFD source 710 can send an RTSP get_paramater (or M3) request to WFD sink 720, which can include a wfd_dlna_uuid parameter. The wfd_dlna_uuid, for example, can be: wfd_dlna_uuid="wfd_dlna_uuid:" SP snk_dlna_uuid CRLF. In general, the RTSP get_paramater can be used to retrieve the value of a parameter of a presentation or stream, in this case the wfd_dlna_uuid parameter. WFD sink 720 can respond with an RTSP get_paramater response. This response, for example, can be: snk_dlna_uuid="none"/8*HEXDIG "-" 4*HEXDIG "-" 4*HEXDIG "-" 4*HEXDIG "-" 12*HEXDIG, which can specify WFD sink 302 DLNA UUID or "none" if DLNA is not supported. In this manner, certain embodiments of the application can make use of the DLNA UUID to communicate to the DMR running on WFD Sink 702.

Figure 8:
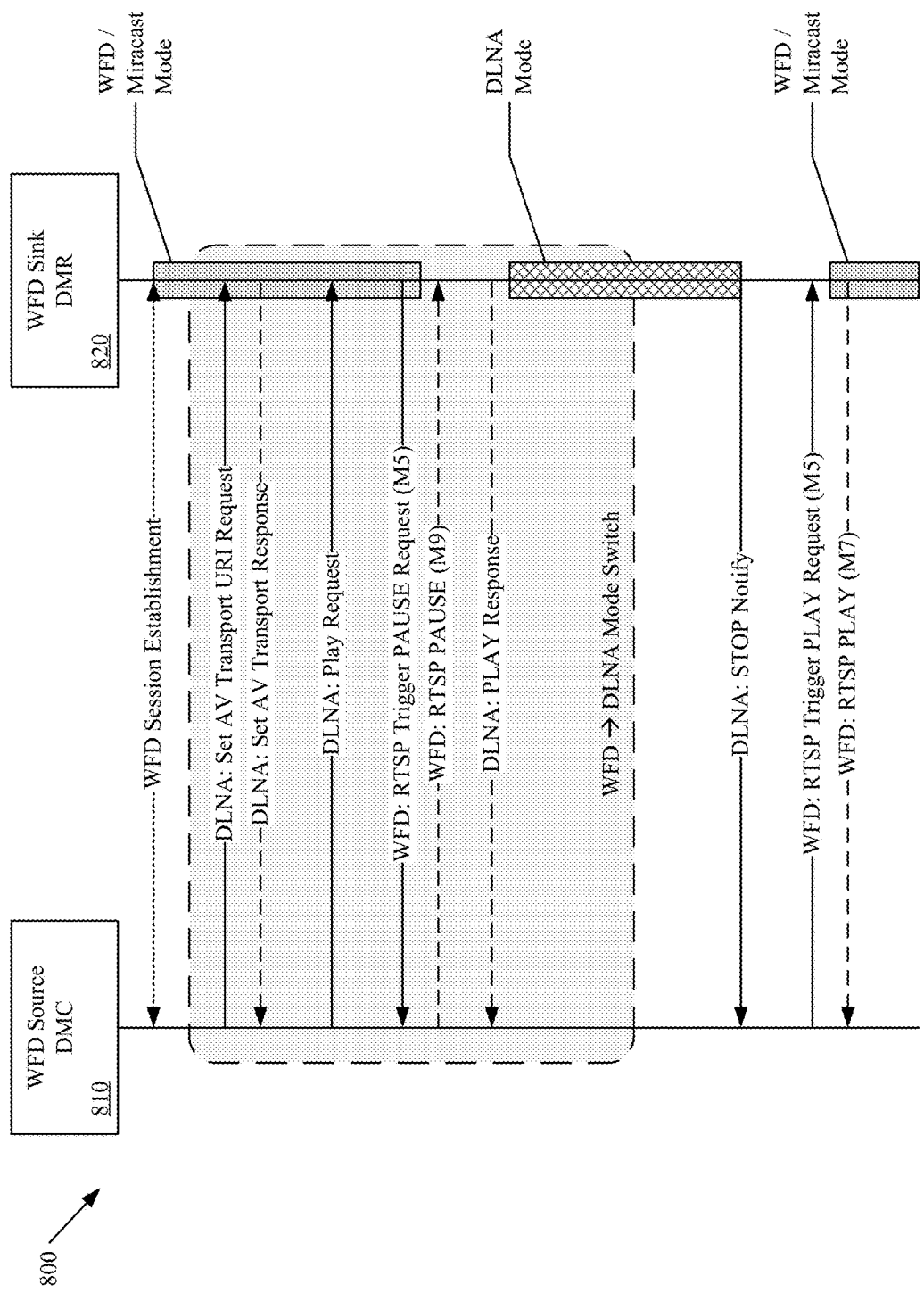
FIG. 8 illustrates an exemplary sequence diagram 800 for Miracast—DLNA protocol switching between two multimedia devices as shown in FIG. 2 according to certain embodiments.

FIG. 8 illustrates an exemplary sequence diagram 800 for Miracast—DLNA protocol switching between two multimedia devices as shown in FIG. 2 according to certain embodiments. As shown in FIG. 8, the highlighted, upper portion of sequence diagram 800 explains the communication sequence between WFD source (or DMC) 810 and WFD sink (or DMR) 820 for switching from Miracast mode to DLNA mode. FIG. 8 also provides, in the lower portion of sequence diagram 800, details about DLNA playback end of stream (EOS), when the devices can switch back to Miracast mirroring mode. Initially, a WFD session connection can exist between WFD source 810 and WFD sink 820 and the devices can be operating in a WFD (or mirroring, Miracast, etc.) mode. This connection can be as discussed elsewhere in this disclosure.

In certain embodiments, WFD source 810 can send a DLNA: set audio/video (AV) transport universal resource identifier (URI) request, in reply to which WFD sink 820 can send a DLNA: set AV transport response. Next, WFD source 810 can send a DLNA: PLAY request, followed by WFD sink 820 sending a WFD: RTSP trigger PAUSE (or M5) request. At this point, the WFD streaming (e.g., Miracast mirroring) can be paused. WFD source 810 can send a WFD: RTSP PAUSE (or M9) message to WFD sink 820, which can free up WFD sink 820 decoder resources from mirroring operations (e.g., Miracast, etc.) and thus, mirror mode is stopped. WFD sink 820 can now send a DLNA: PLAY response to WFD source 810, along with allocating decoder resources to streaming operations, thus starting DLNA playback. At this point the devices can be operating in a DLNA (or streaming, etc.) mode.

In certain embodiments, once DLNA playback has reached end of stream (EOS) and decoder resources are freed at WFD sink 820, WFD sink 820 can send a DLNA: STOP notify message. Next, WFD source 810 can send a WFD: RTSP trigger PLAY (or M5) request, in reply to which WFD sink 820 can send a WFD: RTSP PLAY (or M8) response. At this point, WFD streaming (e.g., Miracast mirroring) can start or resume.

Figure 9:
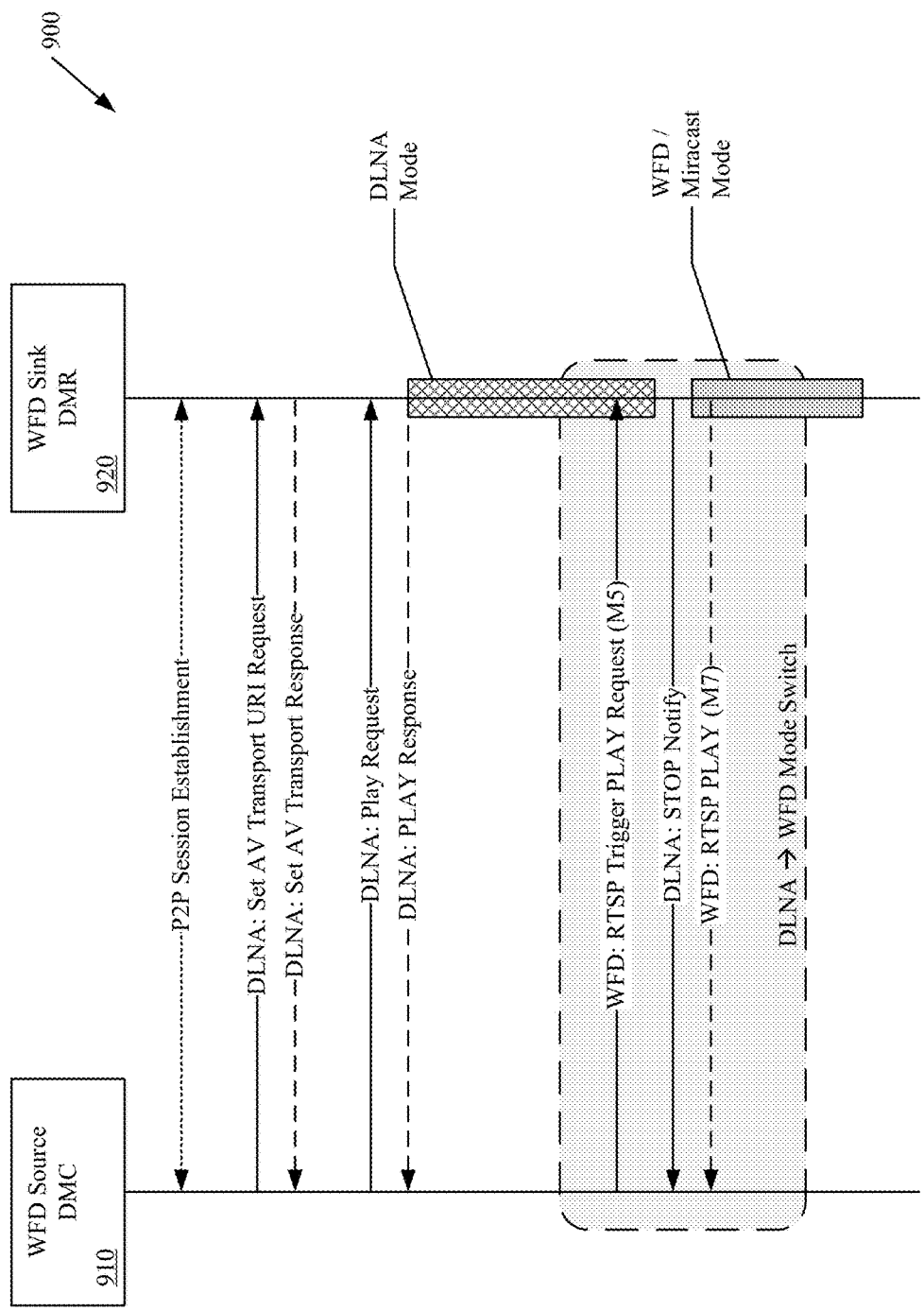
FIG. 9 illustrates an exemplary sequence diagram 900 for Miracast—DLNA protocol switching, before DLNA playback ends, between two multimedia devices as shown in FIG. 2 according to certain embodiments.

FIG. 9 illustrates an exemplary sequence diagram 900 for Miracast—DLNA protocol switching, before DLNA playback ends, between two multimedia devices as shown in FIG. 2 according to certain embodiments. As shown in FIG. 9, the upper portion of sequence diagram 900 explains setting-up a DLNA mode. FIG. 9 also provides, in the highlighted, lower portion of sequence diagram 900, details about switching out of DLNA mode before playback reaches end of stream (EOS), when the devices can switch back to Miracast (e.g., mirroring) mode. Initially, a peer-to-peer (P2P) session connection can exist between WFD source 910 and WFD sink 920. This connection can be as discussed elsewhere in this disclosure.

In certain embodiments, WFD source 910 can send a DLNA: set AV transport URI request, in reply to which WFD sink 920 can send a DLNA: set AV transport response. Next, WFD source 910 can send a DLNA: PLAY request, in reply to which WFD sink 920 can send a DLNA: PLAY response, along with allocating decoder resources to streaming operations, thus starting DLNA playback. At this point the devices can be operating in a DLNA (or streaming, etc.) mode. In certain embodiments, while in DLNA mode, WFD source 910 can send a WFD: RTSP trigger PLAY (or M5) request to WFD sink 920, in response to which DLNA playback can end and WFD sink 920 decoder resources can be freed. Next, WFD sink 920 can send a DLNA: STOP Notify message to WFD source 910. WFD sink 920 can allocate decoder resources to start mirroring operations and send a WFD RTSP PLAY (or M7) message to WFD source 910, starting WFD streaming (e.g., Miracast mirroring). At this point, the devices can be operating in WFD Miracast (e.g., mirroring) mode.

Figure 10:
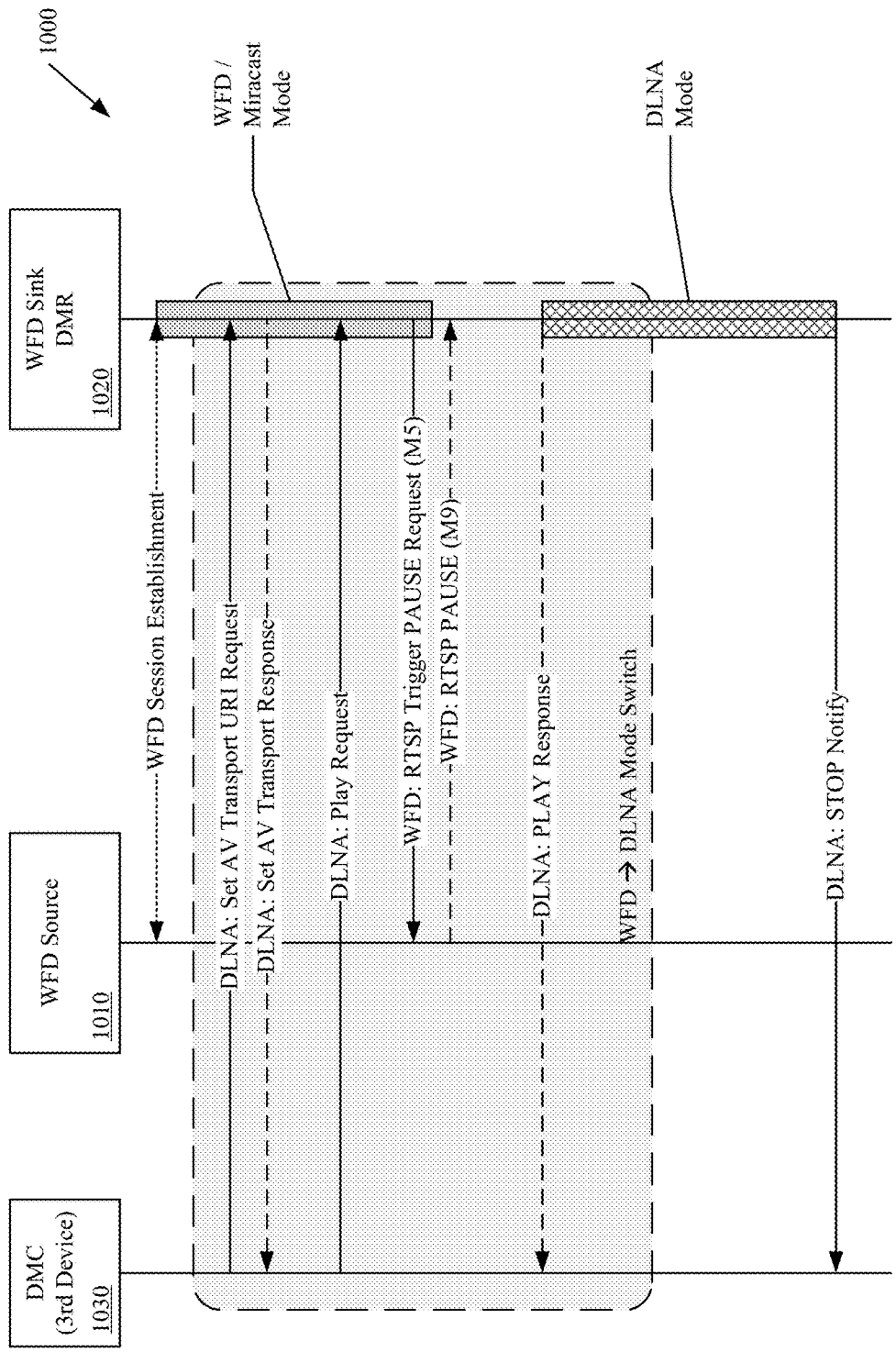
FIG. 10 illustrates an exemplary sequence diagram 1000 for Miracast—DLNA protocol switching including a third multimedia device as shown in FIGS. 3-5 according to certain embodiments.

FIG. 10 illustrates an exemplary sequence diagram 1000 for Miracast—DLNA protocol switching, including a third multimedia device, as shown in FIGS. 3-5 according to certain embodiments. As shown in FIG. 10, sequence diagram 1000 explains a communication sequence between a WFD source 1010, a WFD sink 1020 and a third device DMC 1030, in which DMC 1010 wants to start DLNA playback. Initially, a WFD session connection can exist between WFD source 1010 and WFD sink 1020 and the two devices can be operating in a WFD (or mirroring, Miracast, etc.) mode. This connection can be as discussed elsewhere in this disclosure. Additionally, a connection can exist between DMC 1030 and WFD sink 1020 (not shown).

In certain embodiments, DMC 1030 can send a DLNA: set audio/video (AV) transport universal resource identifier (URI) request to WFD sink 1020, in reply to which WFD sink 1020 can send a DLNA: set AV transport response to DMC 1030. Next, DMC 1030 can send a DLNA: PLAY request to WFD sink 1020, followed by WFD sink 1020 sending a WFD: RTSP trigger PAUSE (or M5) request to WFD source 1010. At this point, the WFD streaming (e.g., Miracast mirroring) can be paused. WFD source 1010 can send a WFD: RTSP PAUSE (or M10) message to WFD sink 1020, which can free up WFD sink 1020 decoder resources from mirroring operations (e.g., Miracast, etc.) and thus, mirror mode is stopped. WFD sink 1020 can now send a DLNA: PLAY response to DMC 1030, along with allocating decoder resources to streaming operations, thus starting DLNA playback. At this point the devices can be operating in a DLNA (or streaming, etc.) mode. Once DLNA playback ends and WFD sink 1020 decoder resources are freed, WFD sink 1020 can send a DLNA: Stop Notify to DMC 1030, thus ending DLNA (e.g., streaming) mode.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, and algorithm steps described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The various illustrative logical blocks, components, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in one or more software modules executed by one or more processing elements, or in a combination of the two. A software module may reside in RAM memory, flash memory, ROM memory, EPROM memory, EEPROM memory, registers, hard disk, a removable disk, a CD-ROM, or any other form or combination of storage medium known in the art. An example storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples and additional elements may be added.

Certain Embodiments

An apparatus for switching between mirroring and streaming protocols for processing multimedia content at a sink device, comprising: means for establishing a level 2 (L2) connection at the sink device; means for starting a first multimedia session using a first multimedia protocol at the sink device using the L2 connection; means for determining whether to switch to a second multimedia session using a second multimedia protocol at the sink device using the L2 connection; and means for switching to the second multimedia session at the sink device using the L2 connection. The apparatus, wherein switching to the second multimedia session includes: means for ending the first multimedia session; and means for starting the second multimedia session using the second multimedia protocol.

An apparatus for switching between mirroring and streaming protocols for processing multimedia content at a sink device, comprising: means for initiating a level 2 (L2) connection at the sink device; means for receiving at the sink device an RTSP option request; means for sending from the sink device an RTSP option response; means for receiving at the sink device an RTSP get_parameter request for a wfd_dlna_uuid parameter; and means for sending from the sink device an RTSP get_parameter response for the wfd_dlna_uuid parameter.

An apparatus for switching between mirroring and streaming protocols for processing multimedia content at a sink device, comprising: means for establishing a level 2 (L2) connection and Miracast session at the sink device; means for receiving at the sink device using the L2 connection a DLNA: set audio/video (AV) transport universal resource identifier (URI) request; means for sending from the sink device using the L2 connection a DLNA: set AV transport response; means for receiving at the sink device using the L2 connection a DLNA: play request; means for sending from the sink device using the L2 connection a WFD: RTSP trigger pause request; means for receiving at the sink device using the L2 connection a WFD: RTSP pause response; means for sending from the sink device using the L2 connection a DLNA: play response; and means for establishing a DLNA session at the sink using the L2 connection. The apparatus, further including: means for determining at the sink device an end-of-stream for the DLNA session; means for sending from the sink device using the L2 connection a DLNA stop notify message; means for receiving at the sink device using the L2 connection a WFD: RTSP trigger play request; means for establishing a second Miracast session at the sink device using the L2 connection; and means for sending from the sink device using the L2 connection a WFD: RTSP play response. The apparatus, further including: means for receiving at the sink device using the L2 connection a WFD: RTSP trigger play request; means for terminating the DLNA session; means for sending from the sink device using the L2 connection a DLNA stop notify message; means for establishing a second Miracast session at the sink device using the L2 connection; and means for sending from the sink device using the L2 connection a WFD: RTSP play response.

An apparatus for switching between streaming and mirroring protocols for processing multimedia content at a sink device, comprising: means for establishing a level 2 (L2) peer-to-peer (P2P) connection at the sink device; means for receiving at the sink device using the L2 connection a DLNA: set audio/video (AV) transport universal resource identifier (URI) request; means for sending from the sink device using the L2 connection a DLNA: set AV transport response; means for receiving at the sink device using the L2 connection a DLNA: play request; means for sending from the sink device using the L2 connection a DLNA: play response; and means for establishing a DLNA session at the sink using the L2 connection. The apparatus, further including: means for receiving at the sink device using the L2 connection a WFD: RTSP trigger play request; means for terminating the DLNA session; means for sending from the sink device using the L2 connection a DLNA stop notify message; means for establishing a Miracast session at the sink device using the L2 connection; and means for sending from the sink device using the L2 connection a WFD: RTSP play response.

An apparatus for switching between mirroring and streaming protocols for processing multimedia content at a sink device, including a controller device separate from a source device, comprising: means for establishing a level 2 (L2) connection and Miracast session between the sink device and the source device; means for receiving at the sink device from the controller device using the L2 connection a DLNA: set audio/video (AV) transport universal resource identifier (URI) request; means for sending from the sink device to the controller device using the L2 connection a DLNA: set AV transport response; means for receiving at the sink device from the controller device using the L2 connection a DLNA: play request; means for sending from the sink device to the source device using the L2 connection a WFD: RTSP trigger pause request; means for receiving at the sink device from the source device using the L2 connection a WFD: RTSP pause response; means for sending from the sink device to the controller device using the L2 connection a DLNA: play response; and means for establishing a DLNA session at the sink using the L2 connection.

A computer-program storage apparatus for switching between mirroring and streaming protocols for processing multimedia content at a sink device comprising at least one memory having one or more software modules stored thereon, the one or more software modules being executable by one or more processors and the one or more software modules comprising: code for establishing a level 2 (L2) connection at the sink device; code for starting a first multimedia session using a first multimedia protocol at the sink device using the L2 connection; code for determining whether to switch to a second multimedia session using a second multimedia protocol at the sink device using the L2 connection; and code for switching to the second multimedia session at the sink device using the L2 connection. The apparatus, wherein switching to the second multimedia session includes: code for ending the first multimedia session; and code for starting the second multimedia session using the second multimedia protocol.

A computer-program storage apparatus for switching between mirroring and streaming protocols for processing multimedia content at a sink device comprising at least one memory having one or more software modules stored thereon, the one or more software modules being executable by one or more processors and the one or more software modules comprising: code for initiating a level 2 (L2) connection at the sink device; code for receiving at the sink device an RTSP option request; code for sending from the sink device an RTSP option response; code for receiving at the sink device an RTSP get_parameter request for a wfd_dlna_uuid parameter; and code for sending from the sink device an RTSP get_parameter response for the wfd_dlna_uuid parameter.

A computer-program storage apparatus for switching between mirroring and streaming protocols for processing multimedia content at a sink device comprising at least one memory having one or more software modules stored thereon, the one or more software modules being executable by one or more processors and the one or more software modules comprising: code for establishing a level 2 (L2) connection and Miracast session at the sink device; code for receiving at the sink device using the L2 connection a DLNA: set audio/video (AV) transport universal resource identifier (URI) request; code for sending from the sink device using the L2 connection a DLNA: set AV transport response; code for receiving at the sink device using the L2 connection a DLNA: play request; code for sending from the sink device using the L2 connection a WFD: RTSP trigger pause request; code for receiving at the sink device using the L2 connection a WFD: RTSP pause response; code for sending from the sink device using the L2 connection a DLNA: play response; and code for establishing a DLNA session at the sink using the L2 connection. The apparatus, further including: code for determining at the sink device an end-of-stream for the DLNA session; code for sending from the sink device using the L2 connection a DLNA stop notify message; code for receiving at the sink device using the L2 connection a WFD: RTSP trigger play request; code for establishing a second Miracast session at the sink device using the L2 connection; and code for sending from the sink device using the L2 connection a WFD: RTSP play response. The apparatus, further including: code for receiving at the sink device using the L2 connection a WFD: RTSP trigger play request; code for terminating the DLNA session; code for sending from the sink device using the L2 connection a DLNA stop notify message; code for establishing a second Miracast session at the sink device using the L2 connection; and code for sending from the sink device using the L2 connection a WFD: RTSP play response.

A computer-program storage apparatus for switching between mirroring and streaming protocols for processing multimedia content at a sink device comprising at least one memory having one or more software modules stored thereon, the one or more software modules being executable by one or more processors and the one or more software modules comprising: code for establishing a level 2 (L2) peer-to-peer (P2P) connection at the sink device; code for receiving at the sink device using the L2 connection a DLNA: set audio/video (AV) transport universal resource identifier (URI) request; code for sending from the sink device using the L2 connection a DLNA: set AV transport response; code for receiving at the sink device using the L2 connection a DLNA: play request; code for sending from the sink device using the L2 connection a DLNA: play response; and code for establishing a DLNA session at the sink using the L2 connection. The apparatus, further including: code for receiving at the sink device using the L2 connection a WFD: RTSP trigger play request; code for terminating the DLNA session; code for sending from the sink device using the L2 connection a DLNA stop notify message; code for establishing a Miracast session at the sink device using the L2 connection; and code for sending from the sink device using the L2 connection a WFD: RTSP play response.

A computer-program storage apparatus for switching between mirroring and streaming protocols for processing multimedia content at a sink device comprising at least one memory having one or more software modules stored thereon, the one or more software modules being executable by one or more processors and the one or more software modules comprising: code for establishing a level 2 (L2) connection and Miracast session between the sink device and the source device; code for receiving at the sink device from the controller device using the L2 connection a DLNA: set audio/video (AV) transport universal resource identifier (URI) request; code for sending from the sink device to the controller device using the L2 connection a DLNA: set AV transport response; code for receiving at the sink device from the controller device using the L2 connection a DLNA: play request; code for sending from the sink device to the source device using the L2 connection a WFD: RTSP trigger pause request; code for receiving at the sink device from the source device using the L2 connection a WFD: RTSP pause response; code for sending from the sink device to the controller device using the L2 connection a DLNA: play response; and code for establishing a DLNA session at the sink using the L2 connection.

What is claimed is:

1. A method for sharing DLNA universally unique identifier (UUID) to assist in switching between mirroring and streaming protocols for processing multimedia content at a sink device, comprising:
   initiating a layer 2 (L2) connection at the sink device;
   receiving at the sink device an real time streaming protocol (RTSP) option request;
   sending from the sink device an RTSP option response;
   receiving at the sink device an RTSP get_parameter request for a wfd_dlna_uuid parameter; and
   sending from the sink device an RTSP get_parameter response for the wfd_dlna_uuid parameter.

2. The method of claim 1, wherein the RTSP get_parameter request for the wfd_dlna_uuid parameter includes wfd_dlna_uuid="wfd_dlna_uuid:" SP snk_dlna_uuid CRLF.

3. The method of claim 2, wherein the RTSP get_paramater response includes: snk_dlna_uuid="none"/8*HEXDIG "-" 4*HEXDIG "-" 4*HEXDIG "-" 4*HEXDIG "-" 12*HEXDIG.

4. A method for switching between mirroring and streaming protocols for processing multimedia content at a sink device, comprising:
   establishing a layer 2 (L2) connection at the sink device;
   utilizing a Real Time Streaming Protocol (RTSP) control protocol to establishing a first session using the mirroring protocol;
   switching between the mirroring protocol and a Digital Living Network Alliance (DLNA) streaming protocol by:
     receiving at the sink device using the L2 connection a Digital Living Network Alliance (DLNA): set audio/video (AV) transport universal resource identifier (URI) request;
     sending from the sink device using the L2 connection a DLNA: set AV transport response;
     receiving at the sink device using the L2 connection a DLNA: play request;
     sending from the sink device using the L2 connection a Wi-Fi Display (WFD): real time streaming protocol (RTSP) trigger pause request;
     receiving at the sink device using the L2 connection a WFD: RTSP pause response;
     sending from the sink device using the L2 connection a Digital Living Network Alliance (DLNA): play response; and
     establishing a session using the DLNA streaming protocol at the sink using the L2 connection.

5. The method of claim 4, wherein the mirroring protocol is one of Miracast®, WiVu™ or Wireless Display (WiDi).

6. The method of claim 4, further including:
   determining at the sink device an end-of-stream for the session using the DLNA streaming protocol;
   sending from the sink device using the L2 connection a DLNA: stop notify message;
   receiving at the sink device using the L2 connection a WFD: RTSP trigger play request;

establishing a second session using the mirroring protocol at the sink device using the L2 connection; and
sending from the sink device using the L2 connection a WFD: RTSP play response.

7. The method of claim 4, further including:
receiving at the sink device using the L2 connection a WFD: RTSP trigger play request;
terminating the session using the DLNA streaming protocol;
sending from the sink device using the L2 connection a DLNA: stop notify message;
establishing a second session using the mirroring protocol at the sink device using the L2 connection; and
sending from the sink device using the L2 connection a WFD: RTSP play response.

8. A method for switching between streaming and mirroring protocols for processing multimedia content at a sink device, comprising:
establishing a layer 2 (L2) peer-to-peer (P2P) connection at the sink device;
receiving at the sink device using the L2 connection a Digital Living Network Alliance (DLNA): set audio/video (AV) transport universal resource identifier (URI) request;
sending from the sink device using the L2 connection a DLNA: set AV transport response;
receiving at the sink device using the L2 connection a DLNA: play request;
sending from the sink device using the L2 connection a DLNA: play response;
establishing a first session using a DLNA streaming protocol at the sink using the L2 connection; and
switching between the DLNA streaming protocol and the mirroring protocol by:
receiving at the sink device using the L2 connection a WFD: RTSP trigger play request;
terminating the first session;
sending from the sink device using the L2 connection a DLNA: stop notify message;
establishing a second session using the mirroring protocol at the sink device using the L2 connection; and
sending from the sink device using the L2 connection a WFD: RTSP play response.

9. The method of claim 8, wherein the mirroring protocol is one of Miracast®, WiVu™ or Wireless Display (WiDi).

10. A method for switching between mirroring and streaming protocols for processing multimedia content at a sink device, including a controller device separate from a source device, comprising:
establishing a layer 2 (L2) connection between the sink device and the source device;
utilizing a Real Time Streaming Protocol (RTSP) control protocol to establish a session using the mirroring protocol;
switching between the mirroring protocol and a Digital Living Network Alliance (DLNA) streaming protocol by;
receiving at the sink device from the controller device using the L2 connection a Digital Living Network Alliance (DLNA): set audio/video (AV) transport universal resource identifier (URI) request;
sending from the sink device to the controller device using the L2 connection a DLNA: set AV transport response;
receiving at the sink device from the controller device using the L2 connection a DLNA: play request;
sending from the sink device to the source device using the L2 connection a Wi-Fi Display (WFD): RTSP trigger pause request;
receiving at the sink device from the source device using the L2 connection a WFD: RTSP pause response;
sending from the sink device to the controller device using the L2 connection a DLNA: play response; and
establishing a session using the DLNA streaming protocol at the sink using the L2 connection.

11. An apparatus for sharing DLNA universally unique identifier (UUID) to assist in switching between mirroring and streaming protocols for processing multimedia content at a sink device, comprising:
one or more memory units;
one or more input/output (I/O) units;
one or more processors coupled to the one or more memory units and to the one or more I/O units, wherein the one or more processors are configured to:
initiate a layer 2 (L2) connection at the sink device;
receive at the sink device an real time streaming protocol (RTSP) option request;
send from the sink device an RTSP option response;
receive at the sink device an RTSP get_parameter request for a wfd_dlna_uuid parameter; and
send from the sink device an RTSP get_parameter response for the wfd_dlna_uuid parameter.

12. The apparatus of claim 11, wherein the RTSP get_parameter request for the wfd_dlna_uuid parameter includes wfd_dlna_uuid="wfd_dlna_uuid:" SP snk_dlna_uuid CRLF.

13. The apparatus of claim 12, wherein the RTSP get_parameter response includes: snk_dlna_uuid="none"/8*HEXDIG "-" 4*HEXDIG "-" 4*HEXDIG "-" 4*HEXDIG "-" 12*HEXDIG.

14. An apparatus for switching between mirroring and streaming protocols for processing multimedia content at a sink device, comprising:
one or more memory units;
one or more input/output (I/O) units;
one or more processors coupled to the one or more memory units and to the one or more I/O units, wherein the one or more processors are configured to:
establish a layer 2 (L2) connection at the sink device;
utilize a Real Time Streaming Protocol (RTSP)control protocol to establish a first session using the mirroring protocol;
switch between the mirroring protocol and a Digital Living Network Alliance (DLNA) streaming protocol by being configured to:
receive at the sink device using the L2 connection a Digital Living Network Alliance (DLNA): set audio/video (AV) transport universal resource identifier (URI) request;
send from the sink device using the L2 connection a DLNA: set AV transport response;
receive at the sink device using the L2 connection a DLNA: play request;
send from the sink device using the L2 connection a Wi-Fi Display (WFD): real time streaming protocol (RTSP) trigger pause request;
receive at the sink device using the L2 connection a WFD: RTSP pause response;
send from the sink device using the L2 connection a DLNA: play response; and
establish a session using the DLNA streaming protocol at the sink using the L2 connection.

15. The apparatus of claim 14, wherein the mirroring protocol is one of Miracast®, WiVu™ or Wireless Display (WiDi).

16. The apparatus of claim 14, wherein the one or more processors are further configured to:
  determine at the sink device an end-of-stream for the session using the DLNA streaming protocol;
  send from the sink device using the L2 connection a DLNA: stop notify message;
  receive at the sink device using the L2 connection a WFD: RTSP trigger play request;
  establish a second session using the mirroring protocol at the sink device using the L2 connection; and
  send from the sink device using the L2 connection a WFD: RTSP play response.

17. The apparatus of claim 14, wherein the one or more processors are further configured to:
  receive at the sink device using the L2 connection a WFD: RTSP trigger play request;
  terminate the session using the DLNA streaming protocol;
  send from the sink device using the L2 connection a DLNA stop notify message;
  establish a second session using the mirroring protocol at the sink device using the L2 connection; and
  send from the sink device using the L2 connection a WFD: RTSP play response.

18. An apparatus for switching between streaming and mirroring protocols for processing multimedia content at a sink device, comprising:
  one or more memory units;
  one or more input/output (I/O) units;
  one or more processors coupled to the one or more memory units and to the one or more I/O units, wherein the one or more processors are configured to:
    establish a layer 2 (L2) peer-to-peer (P2P) connection at the sink device;
    receive at the sink device using the L2 connection a Digital Living Network Alliance (DLNA): set audio/video (AV) transport universal resource identifier (URI) request;
    send from the sink device using the L2 connection a DLNA: set AV transport response;
    receive at the sink device using the L2 connection a DLNA: play request;
    send from the sink device using the L2 connection a DLNA: play response;
    establish a first session using a DLNA streaming protocol at the sink using the L2 connection; and
    switch between the DLNA streaming protocol and the mirroring protocol by being configured to:
      receive at the sink device using the L2 connection a Wi-Fi Display (WFD): RTSP trigger play request;
      terminate the first session;
      send from the sink device using the L2 connection a DLNA stop notify message;
      establish a second session using the mirroring protocol at the sink device using the L2 connection; and
      send from the sink device using the L2 connection a WFD: RTSP play response.

19. The apparatus of claim 18, wherein the mirroring protocol is one of Miracast®, WiVu™ or Wireless Display (WiDi).

20. An apparatus for switching between mirroring and streaming protocols for processing multimedia content at a sink device, including a controller device separate from a source device, comprising:
  one or more memory units;
  one or more input/output (I/O) units;
  one or more processors coupled to the one or more memory units and to the one or more I/O units, wherein the one or more processors are configured to:
    establish a layer 2 (L2) connection between the sink device and the source device;
    utilizing a Real Time Streaming Protocol (RTSP) control protocol to establish a session using the mirroring protocol;
    switch between the mirroring protocol and a Digital Living Network Alliance (DLNA) streaming protocol by being configured to;
      receive at the sink device from the controller device using the L2 connection a Digital Living Network Alliance (DLNA): set audio/video (AV) transport universal resource identifier (URI) request;
      send from the sink device to the controller device using the L2 connection a DLNA: set AV transport response;
      receive at the sink device from the controller device using the L2 connection a DLNA: play request;
      send from the sink device to the source device using the L2 connection a Wi-Fi Display (WFD): RTSP trigger pause request;
      receive at the sink device from the source device using the L2 connection a WFD: RTSP pause response;
      send from the sink device to the controller device using the L2 connection a DLNA: play response; and
    establish a session using the DLNA streaming protocol at the sink using the L2 connection.

* * * * *